(12) United States Patent  
Kortum et al.

(10) Patent No.: US 8,176,523 B2  
(45) Date of Patent: *May 8, 2012

(54) HUMAN FACTORS BASED VIDEO COMPRESSION

(75) Inventors: Philip Ted Kortum, Austin, TX (US); Marc Andrew Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/603,677

(22) Filed: Oct. 22, 2009

(65) Prior Publication Data

US 2010/0040152 A1    Feb. 18, 2010

Related U.S. Application Data

(63) Continuation of application No. 10/891,845, filed on Jul. 15, 2004, now Pat. No. 7,636,933.

(51) Int. Cl.  
*H04N 7/173* (2006.01)

(52) U.S. Cl. ............... 725/96; 725/87; 725/90; 725/93; 725/94

(58) Field of Classification Search .............. 725/87, 725/90, 93–95  
See application file for complete search history.

(56) References Cited

U.S. PATENT DOCUMENTS

2004/0093618 A1* 5/2004 Baldwin et al. ............... 725/101  
2006/0271976 A1 11/2006 Yurt et al.

OTHER PUBLICATIONS

International Search Report and Written Opinion of the International Searching Authority for International Application No. PCT/US2005/025341, Mailed on Sep. 11, 2005 (attached in parent application).  
Yasuhiko Miyazaki, Klara Nahrstedt, Dynamic Coordination of Movies According to Popularity Index and Resource Availability Within a Hierarchial VOD System, 1997 IEEE TENCON—Speech and Image Technologies for Computing and Telecommunications, Dec. 12, 1997, (2 pages) (attached in parent application).  
Anna Watson, M. Angela Sasse, Measuring Perceived Quality of Speech and Video in Multimedia Conferencing Applications, ACM International Multimedia Conference, Sep. 12, 1998, (3 pages) (attached in parent application).  
G. Ghinea, J.P. Thomas, QoS Impact on User Perception and Understanding of Multimedia Video Clips, ACM Multimedia 98—Electronic Proceedings, (4 pages) (attached in parent application), 1998.  
Philip Kortum and Marc Sullivan, Content is King: The Effect of Content on the Perception of Video Quality, Proceedings of the Human Factors and Ergonomics Society 48th Annual Meeting—2004, (5 pages).

* cited by examiner

*Primary Examiner* — Hunter B Lonsberry  
(74) *Attorney, Agent, or Firm* — Toler Law Group, PC

(57) ABSTRACT

Systems and method to compress digital video based on human factors expressed as a desirability score are provided. A particular method includes selecting a compression level based on the desirability score for the particular media content. A first compression level is selected when the desirability score is a first desirability score and a second compression level that is higher than the first compression level is selected when the desirability score is a second desirability score that is higher than the first desirability score. The method also includes providing the compression level to an encoder. The encoder compresses the media content based on the compression level.

20 Claims, 4 Drawing Sheets

HUMAN FACTORS BASED VIDEO COMPRESSION

PRIORITY CLAIM

This application is a continuation of, and claims priority from, U.S. patent application Ser. No. 10/891,845, filed Jul. 15, 2004 and entitled "HUMAN FACTORS-BASED VIDEO COMPRESSION," which is hereby incorporated by reference in its entirety.

FIELD OF THE DISCLOSURE

The present disclosure relates to methods and systems to compress digital video content based on human behavioral data.

BACKGROUND

Increased digital video traffic puts a premium on conserving bandwidth in a given transmission media. This is especially pertinent for bandwidth constrained transmission media, such as cable and wireless. Bandwidth constraint is a challenge that broadcasters, and other providers of digital video content, must overcome to ensure that the quality of the video product meets the expectations of the viewer. Content providers also confront, with respect to demographics and taste, a segmented, kaleidoscopically dynamic, viewer environment.

The selection of an appropriate video compression level is important to content providers that deliver video content over bandwidth constrained channels such as digital subscriber lines (DSLs). The content providers want to minimize the load on the network by choosing the highest compression possible. However, to obtain customer satisfaction with the video content (e.g., movies), the content providers may provide less compression to provide a higher quality signal. To strike a balance between compression and viewer satisfaction, it is common practice for content providers to simply choose a single compression level that has been deemed "acceptable" by viewers for a set of test content. The single compression rate is then used for all content.

Technological capabilities make it possible to modulate the compression of a transmitted signal so that content providers no longer need to be tied to a single compression level for all content. The basis upon which to select compression levels, however, is a data problem, not a technological problem. The problem is complex and involves at least the identification of one or more characteristics that can be used to distinguish the customer satisfaction with a selection of video content choices, a methodology to collect data on a selected characteristic, and relating the data automatically to the compression level of the transmitted video content.

DETAILED DESCRIPTION

Figure 1:
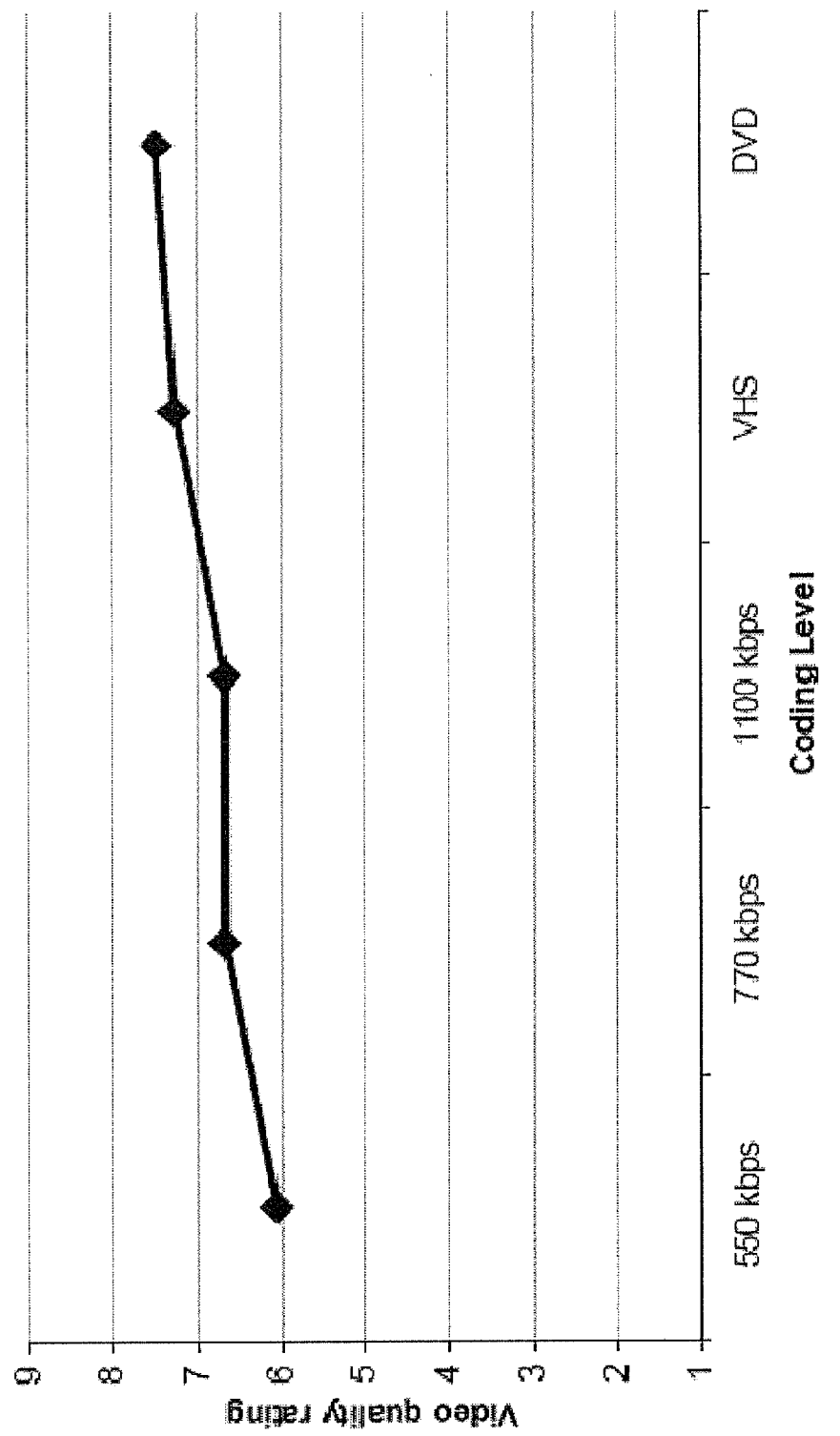
FIG. 1 is a line graph plotting video quality rating data as a function of bandwidth coding.

The present disclosure is described with reference to digital video compression. It is understood, however, that compressing digital video signals is merely an example of a specific embodiment of the present disclosure.

The present disclosure makes use of data that demonstrates that customer perception of sound and video quality of a particular piece of video content is influenced by the desirability of that content. Video content that is deemed highly desirable by viewers gets higher video quality ratings than does video content that is deemed neutral or undesirable. This may mean that highly desirable video content can be compressed further than less desirable video content and still achieve the same overall quality rating by viewers.

In a particular embodiment, a method includes determining a desirability score for media content using a processor. The method includes selecting a compression level based on the desirability score for the media content using the processor. A first compression level is selected when the desirability score is a first desirability score and a second compression level that is higher than the first compression level is selected when the desirability score is a second desirability score that is higher than the first desirability score. The method also includes providing the compression level to an encoder. The encoder compresses the particular media content based on the compression level.

In a particular embodiment, a method includes computing, using one or more processors, a network desirability score of media content based on the desirability of the media content. The method includes comparing the network desirability score to a threshold score. The method also includes adding desirability data associated with the media content to human factors data using the one or more processors when the threshold is satisfied. The human factors data is used to determine a compression level for the particular media content.

In a particular embodiment, a system includes one or more processors that execute instructions to accept desirability data input for media content. The one or more processors execute instructions to calculate a desirability score for the media content from the desirability data input. The one or more processors execute instructions to determine a compression level for the media content based on the desirability score. The one or more processors also execute instructions to output the compression level to one or more compression tools. The one or more compression tools compress the particular media content based on the compression level.

A digital video signal may be transmitted through a conduit chain of diverse transmission media, each of which may have a different bandwidth. The conduit with the smallest bandwidth may limit the speed and digital packet size of the transmitted digital video signal. Increasing the density of information by the use of digital compression techniques conserves bandwidth.

The bandwidth of a medium is proportional to the speed at which the signal on the medium can change. A higher frequency signal changes more rapidly than a lower frequency signal. A signal carries a bit stream and the signal may be transmitted as an electrical signal on a metallic wire or as an electromagnetic radio signal through the air.

A signal is a pulse of bits measured as a function of time, where each pulse represents a symbol. The number of symbols per unit time is the symbol rate. Each symbol is composed of bits. With respect to bandwidth-constrained media, the term "bitrate" is often incorrectly used interchangeably with the term "bandwidth." The bitrate can be increased either by increasing the symbol rate (the number of symbols per second) or by increasing the number of bits per symbol. The latter method improves the spectral efficiency of the medium. Higher spectral efficiency increases the bitrate that can be transmitted by a bandwidth-constrained medium.

Increasing the number of bits per symbol or increasing the symbol rate can increase the bitrate. Increasing the number of bits per symbol does not increase the bandwidth of the given medium. Increasing the symbol rate, however, does increase the bandwidth, because the signal carried by the medium changes more rapidly. The bandwidth of the medium, therefore, is determined by the maximum symbol rate it can transmit.

Radio is an example of a bandwidth-constrained medium in which high spectral efficiency is sought. The radio spectrum is a finite resource that is managed by the government for the public good. For example, the radio spectrum may be managed by auctioning allocations of the spectrum. The high prices obtained by the auctions are an indication of a need to improve the spectral efficiency of the medium.

For many of the analog signal transmission media that are important today (e.g., including telephony (wire and wireless) and radio), bandwidth is constrained due to interference. In wireless transmission, many users share the same channel. Legitimate transmission by a user on a channel may manifest as unwanted interference to another user on that channel. Such interference can be overcome by increasing the transmission power of one signal, but it is self-evident that reciprocated escalating power does not solve the fundamental problem. In wired media, interference manifests as "crosstalk," which is the unwanted bleeding of a transmission from one wire to another wire.

An advantage of digital signal transmission is the ability to regenerate a digital signal at points along its transmission. Regeneration allows transmitted digital signals to maintain superior integrity over distance relative to analog transmission. Digital signals, however, put a premium on compression to get the most out of the bandwidth of the transmission medium.

Compression systems are collections of compression tools (software) that are assembled together to increase the density of information being transmitted. Among the tools in a compression system is an encoder, which performs the actual information compression, and a decoder, such as a set-top cable box familiar to cable TV subscribers. The combination is referred to as CODEC for coder-decoder.

Modern compression systems for mass media delivery are designed with asymmetric complexity. That is, more complexity is evident in the encoder but less complexity is evident in the decoder because there are millions of decoders and only a few encoders (content providers). Usually the encoder need not be specified, only the decoder. The encoder need merely deliver a decodable signal.

The principles behind video compression include the removal of redundancies (spatial and temporal), and the elimination of irrelevant information, such as information that is not visible to the human visual system (HVS), or information that may be removed without being subjectively noticed by the viewer.

The first video compression tool was interlacing. When interlacing is applied, every other line is omitted in a two-frame cycle. Content of the scene is dropped with the benefit of halving the bandwidth required by the signal. The process is applied to every picture, no matter what the content. Interlacing is a systematic compression tool. Interlacing is fine when the picture is static and there is no moving detail. When the picture is not static, the image is blurred.

Adaptive compression systems, in contrast, compress information not systematically but based on content. Adaptive systems change the compression protocol depending on the video content. The process of compression becomes "content adaptive". The compression system intelligently adapts itself to optimally compress the content that is viewed. Compression technology has evolved from the systematic to the adaptive.

Despite the advances in compression systems from systematic to adaptive, the quality of the displayed content may need to be evaluated. Traditional objective measurement of television signal quality is performed by measuring physical parameters such as signal amplitude, timing and signal-to-noise ratio. To characterize the linear and non-linear signal distortions from signal transmission and processing, specially designed static test signals are inserted into the video and analyzed at reception. An advantage of using static test signals is that the static test signals yield numerical values that have been correlated with subjective picture quality. The standard test signals and measurement procedures are defined in the standards such as NTC-7 and EIA RS-250.

The introduction of digital signal processing into television revealed that some of the traditional analog test signals were unable to accurately predict signal distortions in digital video signals. New test waveforms were developed specifically to characterize digital video signals. For example, to explore quantization noise, a ramp signal is used instead of the staircase signal to measure non-linear distortions. The situation is even more complex with the use of digital video compression where picture quality impairments are dependent on picture content. Traditional methods for signal quality measurement measure the analog front and back ends of the system and are unable to measure the perceptual picture quality.

Perceptual coding uses the properties of the HVS. HVS has been employed in various video compression standards, including MPEG-2. This may be done in the video pre-processing and quantization stages. In pre-processing, the source signal is filtered and sampled to reduce the information that is not visible to the HVS. This includes chroma conversion, chroma subsampling, and signal transformation.

The use of digital video compression has a direct impact on objective signal quality measurement. Waveform measurements using the static test-signals fail with compressed digital video. An objective of designing a compression algorithm for digital video is not to replicate the original signal waveform as closely as possible, but to yield a perceptually equivalent approximation of the original signal waveform. Because of bandwidth constraint, the resulting compressed picture quality may be content dependent. In other words, stressful source material (i.e., in terms of spatial detail and motion) produces more visible artifacts and degraded subjective picture quality than less stressful source material.

Subjective picture quality is not a linear function of compression ratio or bitrate. Furthermore, unique digital transmission artifacts (e.g., blocking, error strips and freeze frames) make assessment of picture quality more difficult for digital systems than for analog systems. The time-varying nature of the impairments further complicates quality assessment of digital systems. Digital artifacts may be short-lived and the quality of a digital transmission may fluctuate more than that of an analog transmission.

Quality of the output image from a CODEC is significantly influenced by the criticality of the video sequence. Thus, the selection of appropriate image sequences is an important process.

Non-expert viewers are used to evaluate image quality. Non-expert viewers are people who have no prior professional or extensive personal experience in dealing with video display systems or devices.

For video quality assessment, there is another high-level process that sits on top of the HVS. This is the process that a human uses to make a quality judgment. For example, the HVS might be able to detect an impairment, but the human judgment might not consider the impairment significant enough to influence the quality decision. This peculiarity of human nature may be utilized when assessing video quality by using human factors data regarding the desirability of video content to select a level of digital compression that optimizes the bandwidth available in a constrained transmission medium. A particular example for collecting and evaluating relevant human factors data is described below. The example is drawn from a manuscript by the inventors entitled "Content Is King: The Effect of Content on the Perception of Video Quality," by Philip Kortum and Marc Sullivan, 2004.

EXAMPLE

1. Method

Participants

Forty participants were selected for participation in the trial. Half of the participants were female, and the other half were male. A broad age spectrum was recruited, with 34% of the participants in the 18-29 age bracket, 33% in the 30-50 age bracket and 33% in the 50+ age bracket. All of the participants had self-reported normal or corrected-to-normal vision and hearing. All of the participants were people who regularly rented movies, which was defined as two or more rentals/month on average.

Apparatus and Stimuli

Movie Clips from twenty different movies, which where all major studio releases, were randomly selected for viewing. Only movies that were available in non-letterbox (i.e., 4:3 aspect ratio) on digital video disc (DVD) were used. The decision to use only non-letterbox content was driven by the strong customer reactions, both positive and negative, to the letterbox format. Each of the clips was two minutes in duration. Ten of the clips contained high action/movement scenes and ten contained low action, more easily encoded scenes. Each clip was encoded at the three rates (i.e., 490 kbps, 771 kbps & 1100 kbps). Video home system (VHS) and DVD versions of the same twenty clips were used. The VHS tapes and DVDs were obtained through standard retail outlets and presented to the viewers in their native format (i.e., no additional coding/decoding was used). Including the three encoding levels, the VHS, and the DVD samples, there were a total of one hundred video samples used in the study.

A late model 32" direct view television with built-in stereo sound capabilities was used to present the movie clips. Factory default calibration settings were used for all of the television's video display parameters. A dedicated video set top box was used to deliver the streamed encoded content, while the VHS and DVD samples were delivered using a consumer grade videocassette recorder (VCR) and a consumer grade DVD player. The video source was selected for each video using a professional grade video mixer.

Participants were seated in a couch 11-feet away from the television. The room was illuminated at approximately 3 ft-candles to inhibit reflections and glare off of the television screen.

Procedure

Following the signing of an informed consent, participants were given the following instructions: "Today we would like for you to try out a new way of renting videos. Instead of going to the store and renting a movie you will be able to rent a movie through your television over DSL and start watching it immediately. This type of service is called a "Movie on Demand Service" because you can select and immediately watch any of a wide range of major studio movies. We're interested in what types of movies you are interested in, how you categorize movies, the quality of the acting, if you would rent certain movies, and the picture and sound quality of the movie. We will show you a series of clips from various movies. After each clip you will have 6 questions to answer about the movie. Do you have any questions before we begin?"

Before actual test began, participants were introduced to the task by viewing and rating two practice clips. One clip was a 490 kbps from "Proof of Life" (i.e., the lowest encoding level). The other test clip was in DVD format from "Top Gun" (i.e., the highest encoding level). After each practice clip, the customer filled out a questionnaire with the experimenter present to answer any questions the participant might have about the procedure.

Following the practice clips, each participant viewed twenty different movie clips and rated each clip immediately after its presentation. Each participant saw each clip only once and the level at which that clip was encoded was selected from a counter balanced list. The viewing order of the clips was completely randomized between subjects.

Participants were given the following questions and answer options after they viewed each clip:
1) What category is this film? Action, Drama, Comedy, Suspense, Horror, Family, Sci-Fi
2) What parental rating would you assign this film? G, PG, PG-13, R
3) How would you rate the quality of the acting in the film? Excellent, Good, Only Fair, Poor, Terrible
4) Do you know anything about the movie? (circle all that apply) No, Read reviews, Talked to someone about it, Have seen it before
5) I would like to see this movie. Strongly agree, Substantially agree, Slightly agree, Slightly disagree, Substantially disagree, Strongly disagree
6) How would you rate the overall quality of the sound and picture for this movie? Excellent, Very good, Good, Somewhat good, Fair, Somewhat poor, Poor, Very poor, Bad Questions 1-4 were designed as distracter questions to help insure that the participants were not focusing solely on video picture and sound quality, but rather were making an overall evaluation of the film clips.

2. Results

FIG. 1 is a line graph plotting video quality rating data as a function of bandwidth coding. A 5×3 repeated measures analysis of variance (ANOVA) was conducted to determine the effects of coding level and desire to view the movie on participant perception of video quality. Desire to view a movie was collapsed into 3 categories (i.e., don't want to see, neutral, and want to see) for the purposes of this analysis. As expected, there was a main effect for coding level $F(4, 155.7) = 16.14$, $p<0.0001$, with an increase in quality rating as coding bandwidth increased. A post-hoc test revealed perceived quality at 550 kbps differed from perceived quality at 770 kbps, VHS format and DVD format, and that perceived quality at 770 kbps and 1100 kbps differed from perceived quality at VHS format and DVD format. There was no significant difference between perceived quality at 770 kbps and 1100 kbps, nor was there a significant difference between perceived quality at VHS format and DVD format.

Figure 2:
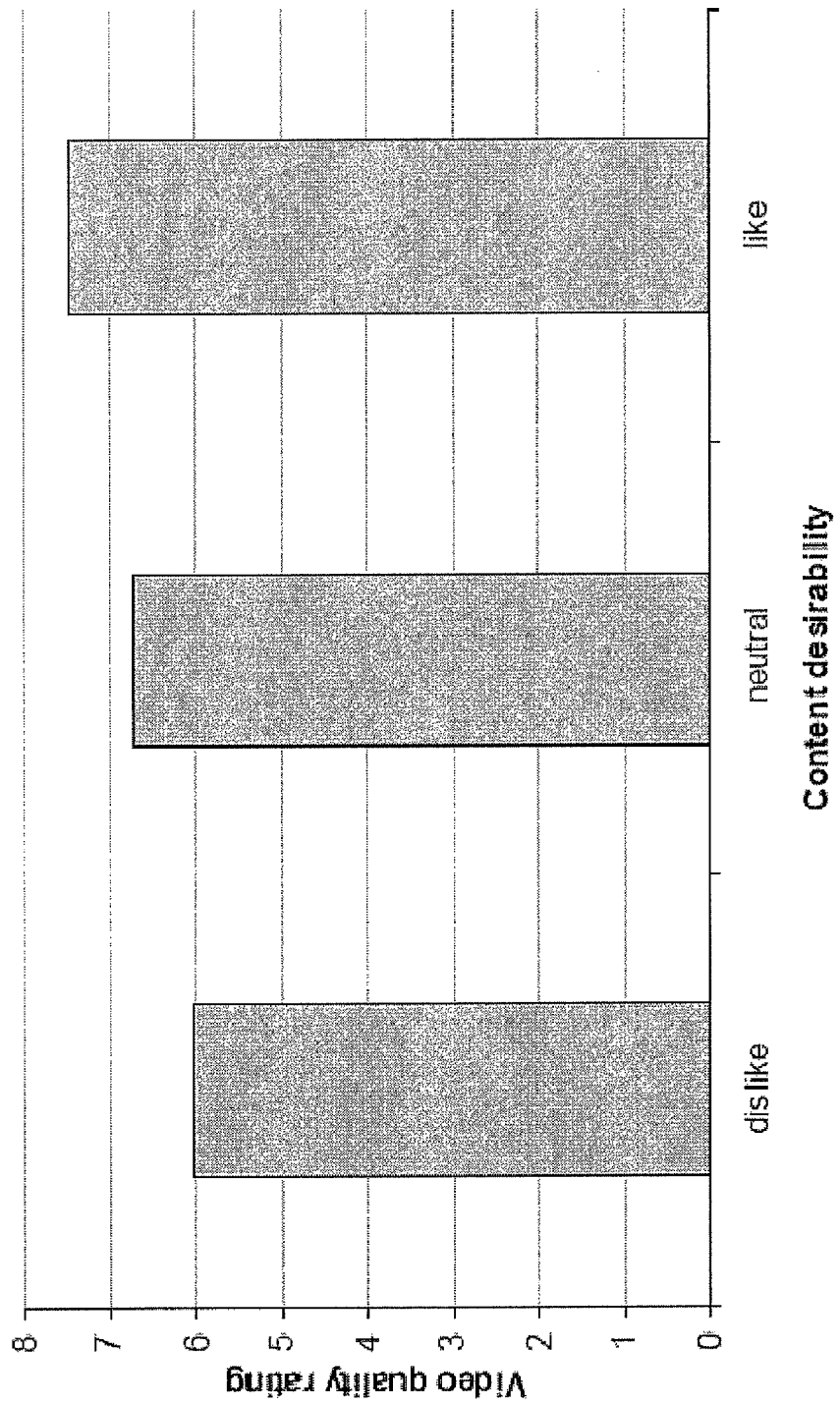
FIG. 2 is a bar graph of average quality rating data as a function of content desirability data.

FIG. 2 is a bar graph of average quality rating data as a function of content desirability data. The data reveal that there was a significant effect for desire to see the movie: $F(2, 250.4) = 30.19$, $p<0.0001$. The quality rating rose as the desire to see the movie increased. A post-hoc analysis revealed that video quality rating differed significantly at all three levels of content desirability.

The data supports the conclusion that the desirability of the content to a viewer plays a significant role in a subsequent rating of the video quality of that content. Video quality of desirable content was, on average, rated 24% higher than video quality of undesirable content and 11% higher than video quality of desire-neutral content. The differences are large enough to suggest that using an incorrect characterization of desirability content in an evaluation of a compression scheme could cause a significant over estimation or significant under estimation of the actual video quality. The conclusion is significant because subjective video quality measurements have not taken the overall perception of the content into account, only the content of scenes during adaptive compression.

In the experiment, the viewing duration was two minutes to allow the participants time to become involved in the story. Further, content was selected from widely viewed, commercially available movies. Both of these experimental design elements would have allowed the viewer an opportunity to become more engaged with the content.

The first study, described above, identified the existence of a content effect. One potential concern about the results is the possibility that they are specific to the subset of content used for the study. To address this concern, a second study was conducted using completely different content. In the second study, participants were able to select ten movies clips from a list of forty movie clips. As before, the content was selected from major studio released movies.

Figure 3:
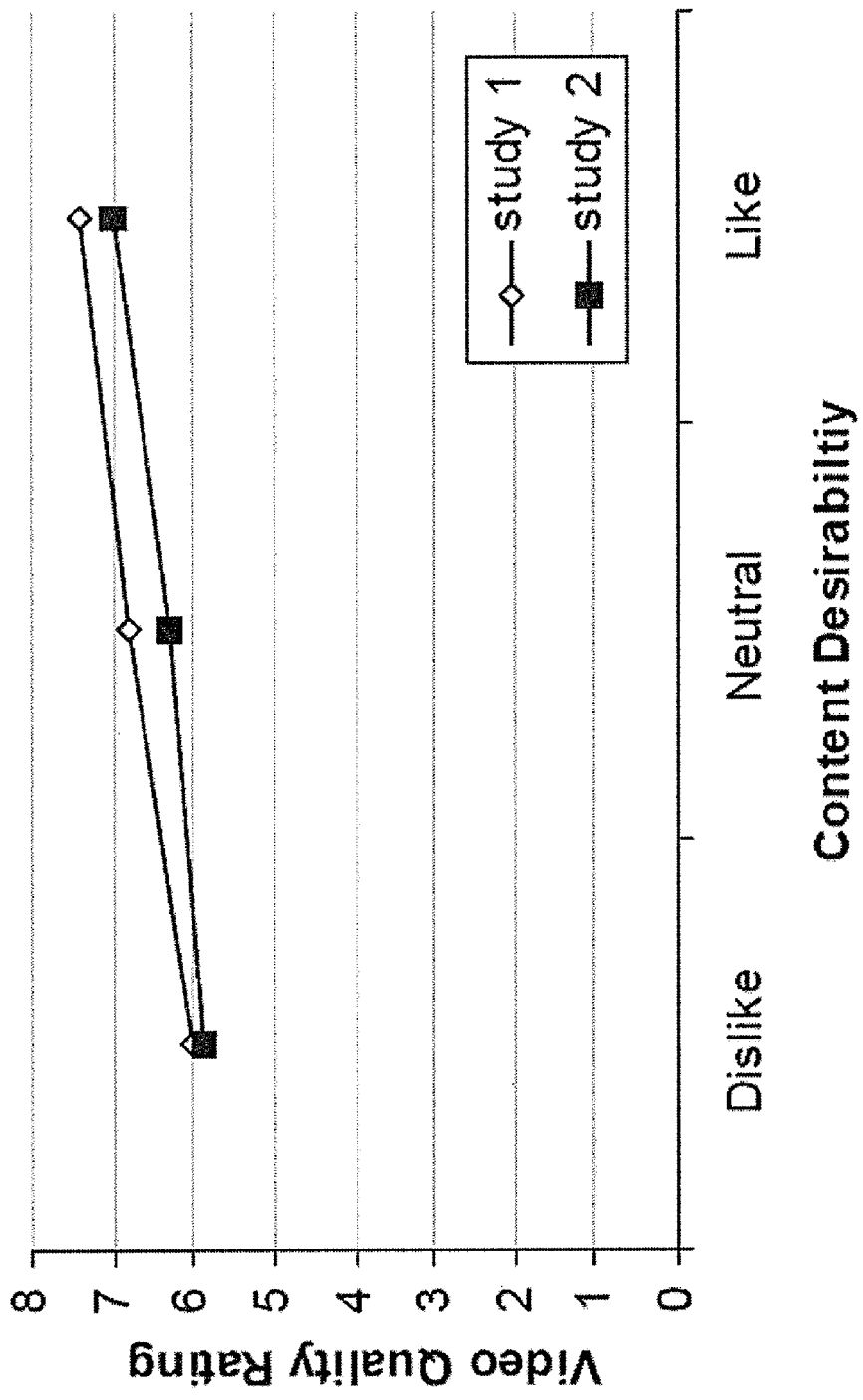
FIG. 3 is a line graph of quality rating data as a function of content desirability data for a first study (open diamonds) and a second study (solid squares).

FIG. 3 is a line graph of quality rating data as a function of content desirability data for the first study (open diamonds) and the second study (solid squares). As shown in FIG. 3, the relationship between the sound/video quality and the desirability of the content was similar to the results from the first study.

A preference of a participant for the content of a video presented had a significant effect on the rating given by the participant for the quality of the video display. Using content that is reflective of the actual end content, rather than 'test' content, produces more accurate ratings of viewer satisfaction. Additionally, viewer preference bias can be incorporated into content compression coding, as illustrated in FIG. 4.

Figure 4:
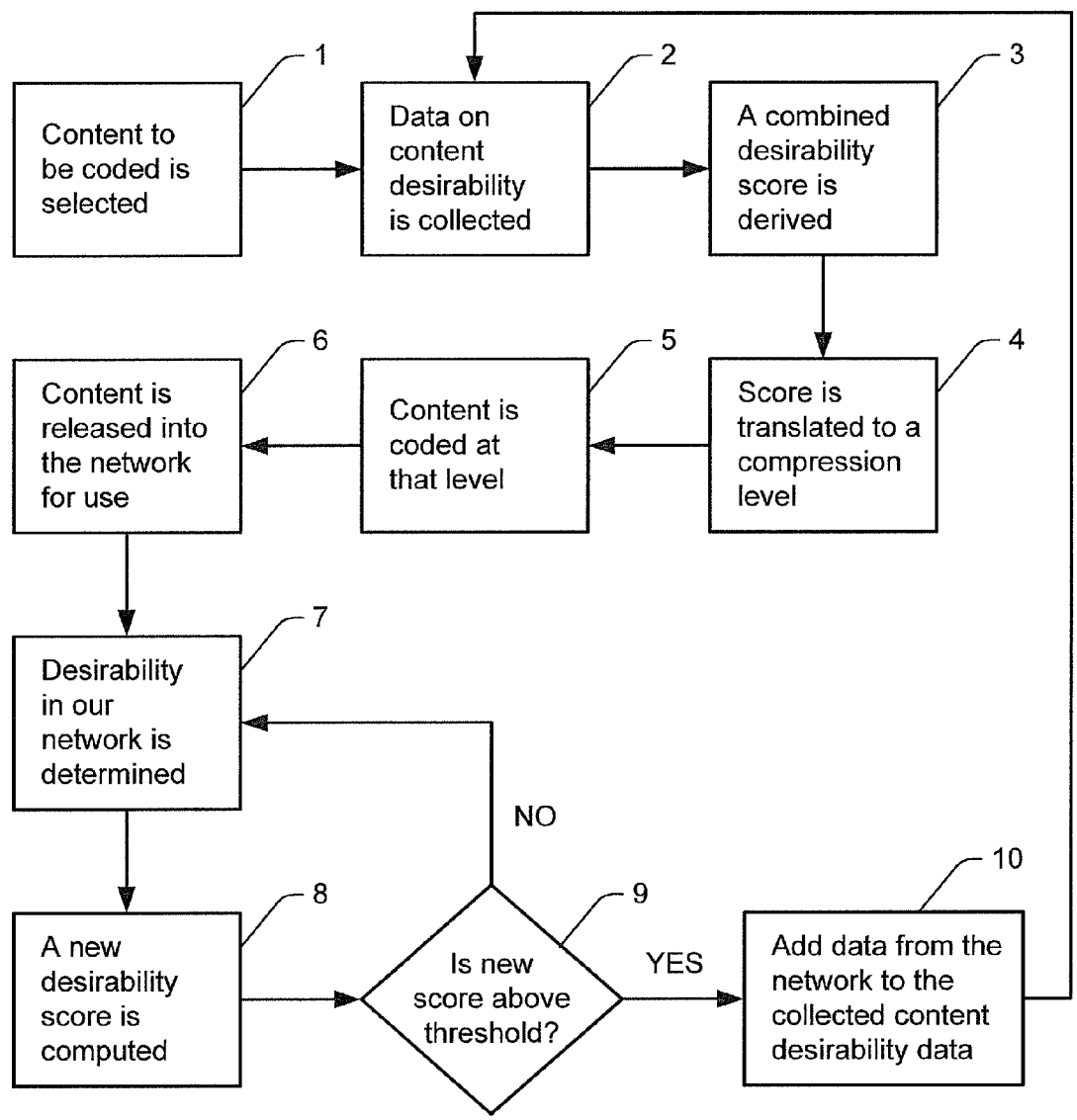
FIG. 4 is a flow chart of a human factors based content compression system for a particular.

FIG. 4 is a flow chart of a human factors-based content compression system for one embodiment of the present invention. At 1, the content that needs to be encoded is selected. At 2, data concerning the desirability of the content is collected. The data may be collected from one or more sources, including but not limited to: Nielson® ratings; retail video sales figures; office figures; awards; award nominations; production personnel popularity (e.g., actors or director); content production budgets; content marketing budgets; advertising expenditures; content distribution channels; content market penetration; repeat content viewing; focus group results; the number of good versus bad reviews; pay-per-view purchases; target demographic marketing data, the number of first release screens nationwide, and so forth.

Data from all of the sources is computed a single, or combined, "desirability score" at 3. The single desirability score is translated into a compression level, at 4. The higher the single desirability score, the higher the compression that is used, up to a specified maximum level of compression. The media content may be coded using the compression level, at 5. The coded media content is released into the network, at 6, for viewing by consumers.

The process of scoring and coding is refined with a feedback loop. At 7, data is collected on how popular the content is on the network. A new score is computed, at 8. The new score determines whether the desirability rating needs to be adjusted based on a cost/benefit threshold setting (i.e., the cost of re-coding the content vs. the benefit gained from lower network utilization). When the desirability rating does not need to be adjusted at 9, the popularity in the network continues to be monitored and checked against the threshold measure by returning to 7. When the new score does pass the threshold test at 9, then, at 10, data from the network is added to the collected desirability data at 2. A new combined desirability score is computed at 3. The media content is re-coded and released.

Embodiments disclosed herein facilitate the determination of a level of compression to use on a particular media content based on human factors instead of using a single compression level for all media content. The disclosed embodiments may advantageously reduce demands on a video delivery network because desirable content (i.e., potentially the most watched content) is compressed at higher levels than content that may be infrequently watched. The compression level for the particular media content may be reviewed to determine whether a desired compression level is used. An overall video quality perceived by users may remain constant between different media content with different compression levels since the correspondence between the desirability of the media content, which may be based on human behavioral data and may affect the perceived video quality, and the compression level used to deliver the media content, which may affect the perceived video quality, are balanced.

The embodiments disclosed herein contemplate methods, systems and content that increase the bandwidth available to a bandwidth-constrained medium for transmitting digital video content. The digital video content that is to be transmitted is compressed in proportion to the desirability of the digital video content. The desirability of the digital video content is determined by obtaining human-factors data indicative of whether a selected item of digital video content is desirable. A desirability score derived from the data is assigned to the digital video content. The desirability score determines the compression level. Feedback systems may change the level of compression as the desirability of the digital video content changes with time in a network.

In a particular embodiment, digital video content may be compressed. The extent of compression may be dependent on the desirability of the digital video content.

In a particular embodiment, a method to increase the bandwidth available to a bandwidth-constrained medium that transmits digital video content includes compressing the digital video content in proportion to the desirability of the digital video content.

In a particular embodiment, a system to increase the bandwidth available to a bandwidth-constrained medium for the transmission of digital video content includes one or more digital video compression tools to compress the digital video content according to a compression code that specifies the level of compression for the content. The system also includes a video content-desirability scorer to provide a desirability score, derive a compression code from the desirability score, and provide the compression code to the compression tools. Digital video content compressed according to the compression code is more compressed than digital video content not compressed according to the compression code, thereby increasing the transmission bandwidth available over the medium relative to bandwidth utilized by digital video content that is not compressed in proportion to a desirability score.

The system may include a codec. The system may include a source of digital video content transmission. The system may also include a desirability score feedback loop to the compression tools to dynamically refine the compression code based on desirability scores that vary over time.

The more compressed content has a more desirable score. The medium may be a broadcast medium, coaxial cable, optical medium, a conventional telephone line, or a DSL. The content transmission may support high definition television display and one or more MPEG-standards display. The scorer may include one or more processors to accept desirability data input, calculate a desirability score from the input data and output to the compression tools a compression code derived from the score. The input data may include one or more data sets selected from the group: Nielson® ratings; retail video sales figures; wholesale video sales figures; video rental volume; theatrical release box office figures; awards; award nominations; production personnel popularity (such as the actors or director); content production budgets; content marketing budgets; advertising expenditures; content distribution channels; content market penetration; repeat content viewing; focus group results; the number of good versus bad reviews; pay-per-view purchases; target demographic marketing data, and the number of first release screens nationwide.

In a particular embodiment, a method for increasing the bandwidth available to a bandwidth-constrained medium for the transmission of digital video content includes scoring the desirability of the video content to obtain a score. The method includes deriving a compression code from the score. The method also includes compressing to the digital video content according to the compression code. Digital video content compressed according to the compression code is more compressed than digital video content not compressed according to the compression code, thereby increasing the transmission bandwidth available over the medium relative to bandwidth utilized by digital video content that is not compressed in proportion to a desirability score.

More compressed digital video content indicates that the digital video content is more desirable than less compressed digital video content. The method may include changing the compression of the content as the desirability of the content varies with time. The method may include obtaining desirability data.

In a particular embodiment, a system to increase the bandwidth available to a bandwidth-constrained medium for the transmission of digital content includes a source of digital video content. The system includes one or more digital video compression tools to compress the digital video content. The system includes a video content-desirability scorer to accept desirability data, derive a score from the data, assign a compression code to the content based on the score, and provide the compression code to the video compression tools whereby the content is compressed in proportion to its desirability. The system also includes a desirability score feedback loop to change the compression of the content as the desirability of the content varies with time.

In a particular embodiment, a method of compressing digital content for release into a network includes selecting content to be coded and collecting data on content desirability. The method also includes deriving a combined desirability score, translating the score into a compression level, and coding the content at that level. The method includes releasing the content into the network for use. The method includes determining the desirability of the content in the network and computing a new desirability score. The method includes setting a threshold score. The method includes determining whether the new score is above the threshold score. The method also includes adding network data to the data used for deriving the combined desirability score when the new score is above the threshold score.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   determining a desirability score for media content using a processor;
   selecting a compression level based on the desirability score for the media content using the processor, wherein a first compression level is selected when the desirability score is a first desirability score and a second compression level that is higher than the first compression level is selected when the desirability score is a second desirability score that is higher than the first desirability score; and
   providing the compression level to an encoder, wherein the encoder compresses the media content based on the compression level.

2. The method of claim 1, further comprising providing the compressed media content to a network.

3. The method of claim 2, further comprising:
   computing a network desirability score based on a desirability of the media content; and
   comparing the network desirability score to a threshold score.

4. The method of claim 3, wherein the threshold score is selected based on a cost of recoding the media content and a benefit gained from lower network utilization.

5. The method of claim 3, further comprising:
recomputing the desirability score for the media content based at least in part on the desirability of the media content when the network desirability score satisfies the threshold score;
selecting a third compression level based on the recomputed desirability score; and
providing the third compression level to the encoder to compress the media content based on the third compression level.

6. The method of claim 3, further comprising:
recomputing the network desirability score based on the desirability of the media content when the network desirability score does not satisfy the threshold score; and
comparing the recomputed network desirability score to the threshold score.

7. The method of claim 1, further comprising using a decoder to uncompress the compressed media content.

8. The method of claim 7, wherein the decoder is part of a set-top box.

9. The method of claim 1, wherein determining the desirability score comprises analyzing at least one of prior viewer ratings for the media content, retail video sales figures for the media content, wholesale video sales figures for the media content, video rental volume for the media content, theatrical release box office figures for the media content, awards for the media content, and award nominations for the media content.

10. The method of claim 1, wherein the second compression level is less than or equal to a maximum specified compression level.

11. A method, comprising:
computing, using one or more processors, a network desirability score of media content based on measured data associated with the media content;
comparing the network desirability score to a threshold score using the one or more processors; and
adding desirability data of the media content to human factors data using the one or more processors when the threshold score is satisfied, wherein the human factors data is used to determine a compression level for the media content.

12. The method of claim 11, further comprising retrieving the media content from a source of digital video content.

13. The method of claim 11, further comprising, when the threshold score is satisfied:
computing an overall desirability score for the media content based on the human factors data and based on the desirability data associated with the particular media content;
determining the compression level based on the overall desirability score; and
providing the compression level to an encoder, wherein the encoder compresses the media content based on the compression level.

14. The method of claim 13, further comprising introducing the media content into a network.

15. The method of claim 14, wherein the network is a cable television network.

16. The method of claim 11, further comprising, when the threshold score is not satisfied:
recomputing, using the one or more processors, the network desirability score of the media content; and
comparing the recomputed network desirability score to the threshold score.

17. The method of claim 11, wherein the human factors data includes at least one of popularity of a director of the media content, popularity of one or more actors in the media content, production budget of the media content, marketing budget of the media content, advertising expenditures for the media content, content distribution channels for the media content, content market penetration for the media content, repeat viewing data for the media content, focus group results for the media content, target demographic marketing data for the media content, and a number of first release screens for the media content.

18. The method of claim 11, wherein the threshold score is selected based on a cost of recoding the media content and a benefit gained from lower network utilization.

19. A system, comprising:
one or more processors, wherein the one or more processors execute instructions to:
accept desirability data input for media content;
calculate a desirability score for the media content from the desirability data input;
determine a compression level for the media content based on the desirability score, wherein a first compression level is selected as the compression level when the desirability score is a first desirability score and a second compression level that is higher than the first compression level is selected as the compression level when the desirability score is a second desirability score that is higher than the first desirability score; and
output the compression level to one or more compression tools, wherein the one or more compression tools compress the media content based on the compression level.

20. The system of claim 19, wherein the media content comprises digital video content.

* * * * *